(12) United States Patent
McIntyre et al.

(10) Patent No.: US 10,710,712 B2
(45) Date of Patent: Jul. 14, 2020

(54) ROTOR BLADE AFTERBODY

(71) Applicant: Bell Helicopter Textron Inc., Fort Worth, TX (US)

(72) Inventors: Joel J. McIntyre, Southlake, TX (US); Michael Christopher Burnett, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 124 days.

(21) Appl. No.: 15/935,927

(22) Filed: Mar. 26, 2018

(65) Prior Publication Data

US 2019/0291861 A1    Sep. 26, 2019

(51) Int. Cl.
| | |
|---|---|
| *B64C 27/473* | (2006.01) |
| *B64C 27/467* | (2006.01) |
| *B64C 29/00* | (2006.01) |
| *B64C 11/26* | (2006.01) |

(52) U.S. Cl.
CPC ............ *B64C 27/473* (2013.01); *B64C 11/26* (2013.01); *B64C 27/467* (2013.01); *B64C 29/0033* (2013.01); *B64C 2027/4736* (2013.01)

(58) Field of Classification Search
CPC  B64C 27/473; B64C 11/26; B64C 2027/4736
See application file for complete search history.

(56) References Cited

U.S. PATENT DOCUMENTS

| | | | | |
|---|---|---|---|---|
| 2,659,444 | A | * | 11/1953 | Stanley .............. B29D 99/0028 416/226 |
| 3,093,219 | A | * | 6/1963 | Ramme ................. B64C 27/473 138/117 |
| 3,321,019 | A | * | 5/1967 | Dmitroff ................. B64C 27/48 416/229 R |
| 4,083,656 | A | | 4/1978 | Braswell et al. |
| 4,892,462 | A | * | 1/1990 | Barbier .............. B29D 99/0025 416/134 A |
| 8,657,581 | B2 | * | 2/2014 | Pilpel ...................... F03D 3/062 416/226 |
| 2011/0176928 | A1 | * | 7/2011 | Jensen ................. F03D 1/0675 416/233 |
| 2017/0327205 | A1 | | 11/2017 | Paulson et al. |
| 2017/0334548 | A1 | | 11/2017 | Foskey et al. |

OTHER PUBLICATIONS

Nissen, Jeffrey, et al., "Methods of Customizing, Manufacturing, and Repairing a Rotor Blade Using Additive Manufacturing Processes and a Rotor Blade Incorporating the Same," U.S. Appl. No. 15/658,928, filed Jul. 25, 2017, pp. 1-51.

* cited by examiner

*Primary Examiner* — Igor Kershteyn
*Assistant Examiner* — Juan G Flores
(74) *Attorney, Agent, or Firm* — Winstead PC

(57) ABSTRACT

An afterbody for a rotor blade of a rotorcraft is unitarily formed of a single material of construction. The afterbody includes an upper surface disposed from a lower surface, a concave leading edge connected to the upper surface and the lower surface, and a trailing edge formed at an intersection of the upper surface with the lower surface.

18 Claims, 7 Drawing Sheets

ROTOR BLADE AFTERBODY

BACKGROUND

This section provides background information to facilitate a better understanding of the various aspects of the disclosure. It should be understood that the statements in this section of this document are to be read in this light, and not as admissions of prior art.

A rotorcraft or rotary-wing aircraft is a heavier-than-air flying machine that uses lift generated by wings called rotary wings or rotor blades that revolve around a mast. A conventional rotor blade includes a spar connected to a multi-piece afterbody forming an airfoil shape. The spar is the main structural member of the rotor blade and is designed to carry the primary centrifugal and bending loads of the rotor blade. FIG. 7 illustrates an example of a prior art rotor blade described in U.S. Patent Application Publication No. 2017/033458. At the leading edge of the conventional rotor blade, a sheath 52 and an abrasion strip 56 are connected to the spar 40 and may encompass a foam filler 54. A multi-piece afterbody is connected to the spar and includes at least a separate core 66, a separate upper skin 62, a separate lower skin 68, and a separate trailing edge wedge member 64. The upper skin and lower skin are typically a thermoset material in the form of carbon composite layers. The upper skin and lower skin are adhered spanwise to the spar at separate connection points 42, 44. The upper and lower skins surround the core and the trailing edge wedge member. The joining of the upper skin to the lower skin at the trailing edge wedge member of the multi-piece afterbody creates a trailing edge with a thickness 46 comprised of at least the thickness of the material of the upper and lower skins and the bonding agent used to join them together. The core is typically a thermoset material in the form of a NOMEX® honeycomb structure disposed spanwise along the trailing edge of the spar. The upper and lower skins may transfer some shear loads in the beam direction to the spar at connection points 42, 44, while the NOMEX® material of the core does not transfer any load in the chord direction.

SUMMARY

An example of an afterbody for a rotor blade of a rotorcraft includes a body unitarily formed of a single material of construction including an upper surface disposed from a lower surface, a leading edge connected to the upper surface and the lower surface, and a trailing edge formed at an intersection of the upper surface with the lower surface.

An example of a rotor blade for a rotorcraft includes a one-piece afterbody formed of a single material of construction without a separate upper skin and without a separate lower skin, and a spar adhered to the one-piece afterbody.

An example of a rotor blade for a rotorcraft includes a spar including a root section and a tip section, an afterbody including a curved leading edge, an entirety of the curved leading edge adhered to the spar with a single bonded joint, and a chord-wise cross-sectional shape of the afterbody includes an upper surface connected to the curved leading edge, a lower surface connected to the curved leading edge, a trailing edge formed at an intersection of the upper surface with the lower surface, and a customized internal structure unitarily formed of a single material of construction with and encompassed by the upper surface, the lower surface, and the curved leading edge.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
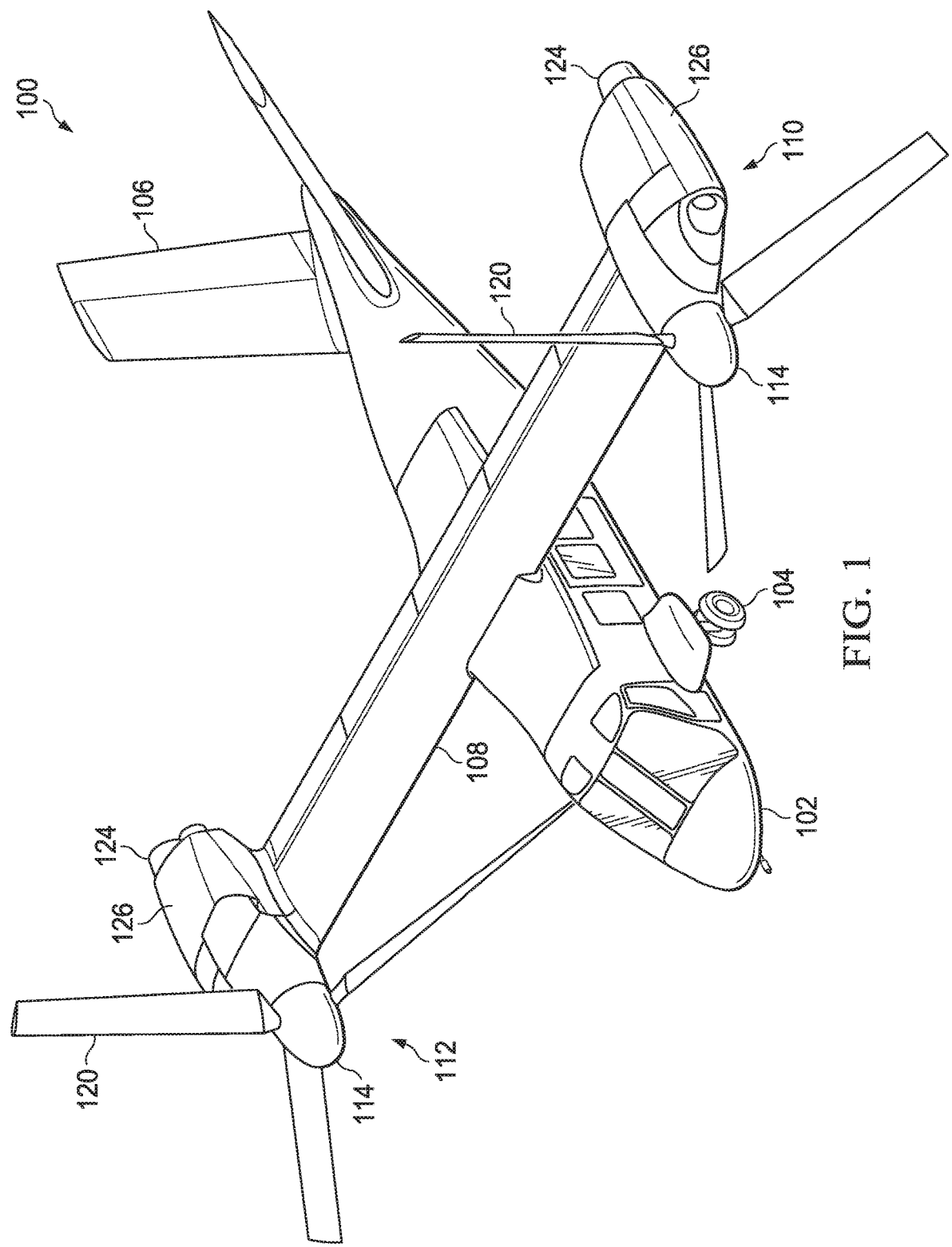
FIG. 1 is a perspective view of a tiltrotor aircraft in a cruise mode position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1, rotorcraft 100 is illustrated. Rotorcraft 100 may include fuselage 102, landing gear 104, tail member 106, wing 108, propulsion system 110, and propulsion system 112. Fuselage 102 represents the body of rotorcraft 100 and may be coupled to propulsion systems 110, 112 such that the propulsion systems may move rotorcraft 100 through the air. Each propulsion system 110, 112 includes proprotors 114 operatively connected to engine 124 housed within nacelle 126. Each proprotor 114 may have a plurality of rotor blades 120 associated therewith. Engine 124 and nacelle 126 may pivot with proprotor 114 between airplane mode and helicopter mode. The position of each proprotor 114 as well as the pitch of rotor blades 120 may be selectively controlled in order to selectively control direction, thrust, and lift of rotorcraft 100. Landing gear 104 supports rotorcraft 100 when rotorcraft 100 is landing or when rotorcraft 100 is at rest on the ground.

FIG. 1 illustrates rotorcraft 100 in airplane or cruise mode, in which proprotors 114 are positioned substantially horizontal to provide forward thrust in which a lifting force is supplied by wing 108. When proprotors 114 are positioned substantially vertical, rotorcraft 100 is in helicopter or hover mode and the proprotors provide lifting thrust. It should be appreciated that rotorcraft 100 can be operated such that proprotors 114 are selectively positioned between airplane mode and helicopter mode, which can be referred to as a conversion mode.

Generally each propulsion system includes a drive mast driven by a power source, a yoke connected to the drive mast with a hub, and rotor blades indirectly connected to the yoke with inboard and outboard bearing assemblies. Bearings included in the inboard and outboard bearing assemblies accommodate forces acting on the rotor blades allowing each rotor blade to flex with respect to the yoke/mast and other rotor blades. The weight of the rotor blades and the lift of rotor blades may result in transverse forces on the rotor blades, yoke, and other components. Examples of transverse forces may include forces resulting from leading, lagging, and coning of the rotor blades. Leading and lagging generally refers to the movement of a rotor blade in the plane of rotation. Coning generally refers to the upward and downward flexing of a rotor blade out of the plane of rotation due to lift forces acting on the rotor blade. The rotor blades may be subject to other forces, such as axial and feathering forces. Axial forces generally refer to the centrifugal force on the rotor blades during rotation of the rotor blades. Feathering forces generally refer to forces resulting from twisting motions that cause a rotor blade to change pitch. The power source, drive mast, and yoke are components for transmitting torque. The power source may include a variety of components including an engine, a transmission, and differentials. In operation, the drive mast receives torque from the power source and rotates the yoke. Rotation of the yoke causes the rotor blades to rotate with the drive mast and yoke.

Rotor blade 120 is illustrated in the context of rotorcraft 100; however, it is understood by those skilled in the art that rotor blade 120 can be implemented in a variety of ways on a variety of rotorcraft including, for example, helicopters, tiltrotor aircraft, tiltwing aircraft, quad tiltrotor aircraft, unmanned aircraft and the like. As such, those skilled in the art will recognize that rotor blade 120 can be integrated into a variety of rotorcraft configurations.

Figure 2:
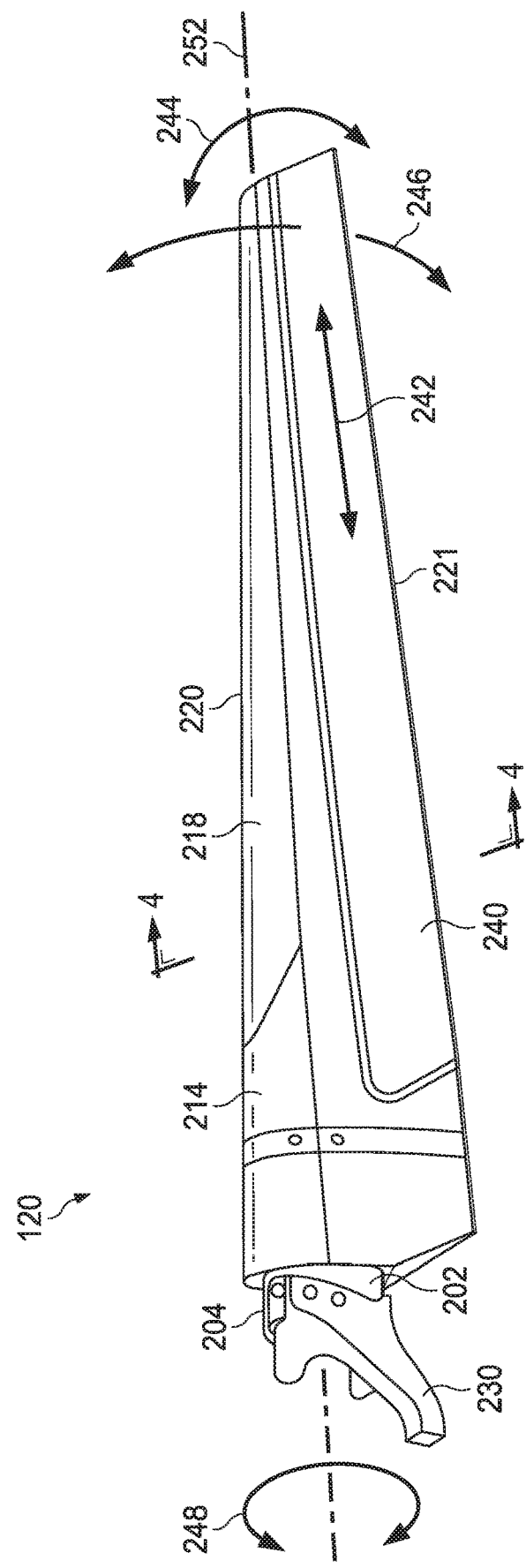
FIG. 2 is a perspective view of a rotor blade according to one or more aspects of the disclosure.
Figure 3:
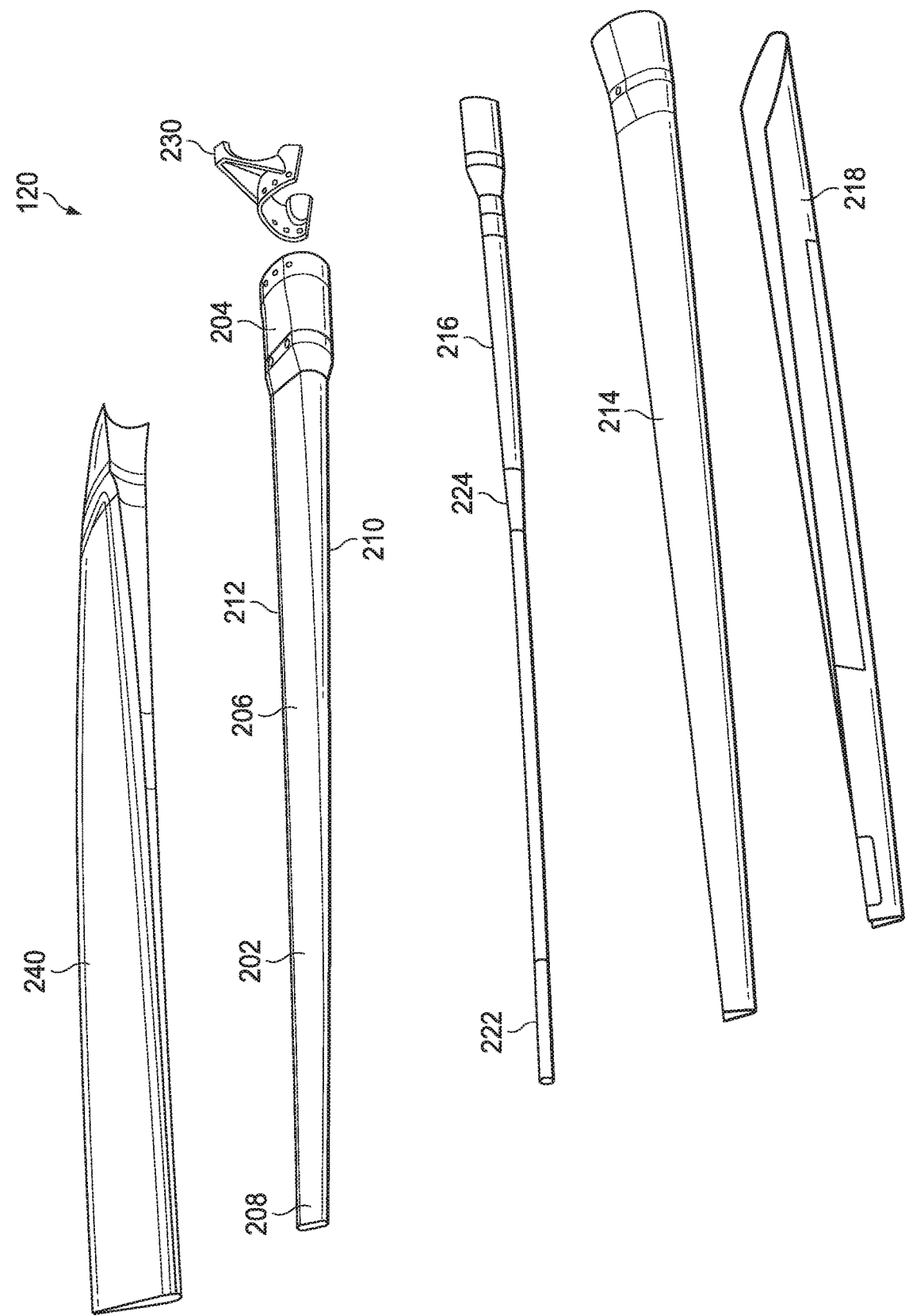
FIG. 3 is an exploded perspective view of a rotor blade according to one or more aspects of the disclosure.
Figure 4:
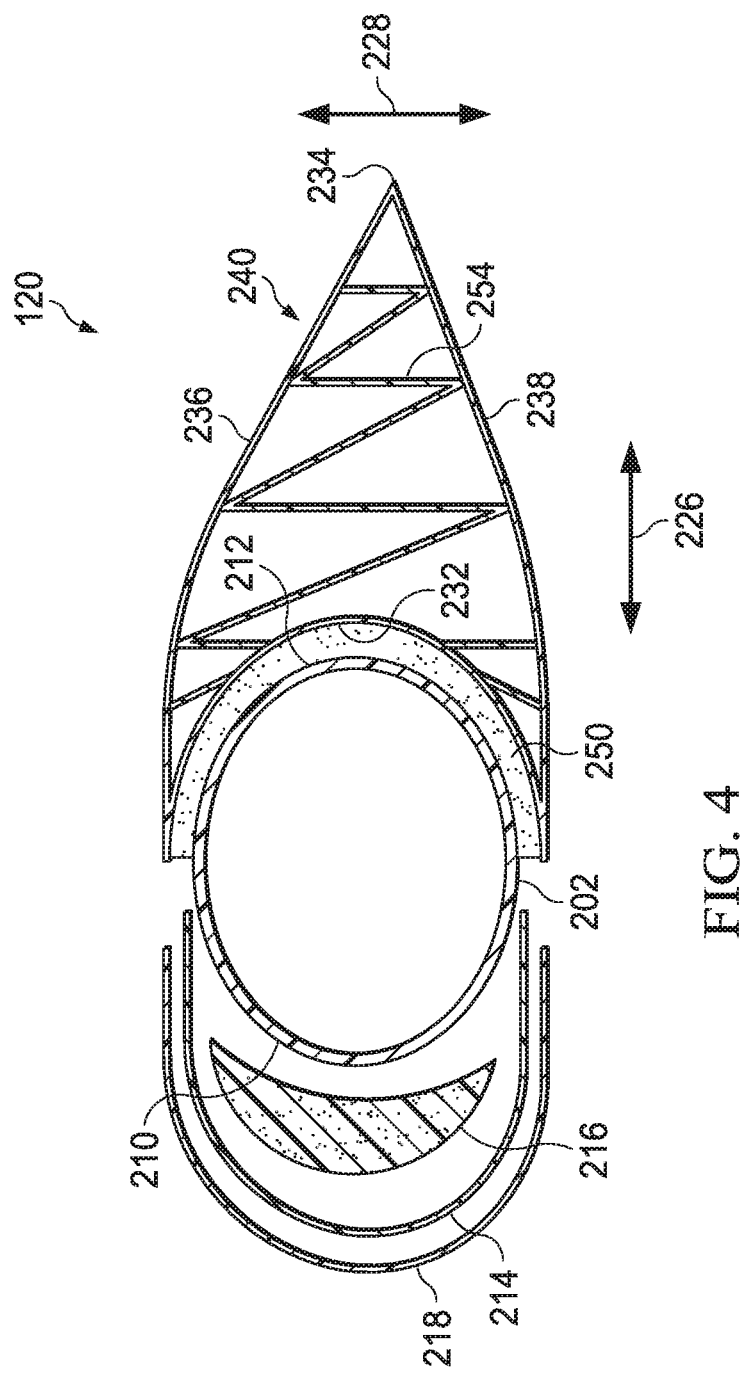
FIG. 4 is a cross-sectional view of a rotor blade according to one or more aspects of the disclosure taken along line 4-4 of FIG. 2.

Referring to FIGS. 2-4, rotor blade 120 is shown. Rotor blade 120 includes spar 202. Spar 202 includes root section 204, main section 206, tip section 208, leading edge 210 and trailing edge 212. Spar 202 may include a root-to-tip twist in the range of about 30 degrees to about 40 degrees. Spar 202 has a generally oval cross section along at least main section 206 with smooth transitions between leading edge 210 and trailing edge 212. Other cross-sectional shapes, for example, D-shaped are envisioned. Spar 202 may be a unitary thermoset structure formed of a plurality of composite material layers such as fiberglass fabric, carbon fabric, fiberglass tape, carbon tape and combinations thereof. After thermoset curing, the material layers form a high strength, lightweight solid composite member.

Sheath 214, foam filler 216, and abrasion resistant strip 218 form leading edge 220 of rotor blade 120. Sheath 214 has a generally C-shaped cross section and is securably attached spanwise to spar 202 using adhesive, curing or other suitable coupling technique. Sheath 214 is a unitary structure formed of a plurality of composite layers. Sheath 214 provides shear stiffness for rotor blade 120. Foam filler 216 is disposed spanwise between spar 202 and sheath 214. Foam filler 216 is sized and shaped to support sheath 214 at a position relative to spar 202. Foam filler 216 may include one or more tuning weights, such as tip tuning weight 222 and mid span tuning weight 224. It is understood that foam filler 216 may be omitted leaving a gap between sheath 214 and spar 202. Abrasion resistant strip 218 is disposed spanwise on the leading edge of sheath 214 and is securably attached thereto using adhesive or other suitable coupling technique. Abrasion resistant strip 218 may be formed from a metal such as stainless steel and is designed to protect sheath 214, foam filler 216, and leading edge 210 of spar 202 from erosion and impacts.

Chord direction 226 refers to the direction of a straight line joining the leading and trailing edges of an airfoil. Chord or chord length is used to describe the width of any section along the span of an airfoil such as a rotor blade. The chord of a section is determined by measuring the distance between leading and trailing edges in the direction of the airflow. Accordingly, beam direction 228 refers to a straight line that is generally perpendicular to the chord or perpendicular to the direction of the airflow.

Rotor blade 120 includes pitch horn 230. Pitch horn 230 may be formed from metal such as machined aluminum. Pitch horn 230 is securably coupled to spar 202 with a plurality of bolts. In operation, pitch horn 230 is connected to the control system of rotorcraft 100 enabling the pilot to selectively control the pitch of rotor blades 120.

Rotor blade 120 includes afterbody 240. Afterbody 240 is a one-piece or unitary structure formed of a single thermoplastic material of construction. Afterbody 240 does not include a separate core and separate trailing edge wedge. Afterbody 240 does not include a separate upper skin and a separate lower skin. Afterbody 240 does not include a separate core and separate trailing edge wedge encompassed by a separate upper skin and a separate lower skin as is typical in a multi-piece afterbody. The one-piece design of afterbody 240 is lightweight and structurally efficient which aids in manufacturing operations while reducing part count. Contrary to the thermoset material used to manufacture the core of a conventional multi-piece afterbody, the thermoplastic material of afterbody 240 may be formed to any desirable shape or structure in order to provide strength or force resistance in both chord direction and beam direction. The primary physical difference between thermoset material and thermoplastic material is that thermoplastics can be remelted back into a liquid, whereas thermoset plastics always remain in a permanent solid state.

As shown in FIG. 4, afterbody 240 has a chord-wise cross-section that is generally wedge-shaped with a concave curved leading edge 232 and a pointed trailing edge 234. Upper surface 236 extends from leading edge 232 to trailing edge 234. Lower surface 238, disposed from upper surface 236, extends from leading edge 232 to trailing edge 234. Trailing edge 234 is the intersection of upper surface 236 with lower surface 238. Internal structure 254 is unitarily formed with and encompassed by leading edge 232, upper surface 236, and lower surface 238.

Trailing edge 234 of afterbody 240 forms trailing edge 221 of rotor blade 120. The curved surface of leading edge 232 matches the curved surface of trailing edge 212 of spar 202 at any chord-wise cross-section along the span of spar 202. It is understood that leading edge 232 may be any shape, including but not limited to a flat surface, which matches the trailing edge 212 of the spar. Leading edge 232 is affixed to trailing edge 212 of spar 202 at connection 250. Connection 250 is a single bonded joint of adhesive. The single bonded joint of adhesive includes the entire leading edge 232 of afterbody 240. The single bonded joint of adhesive adheres the entire leading edge 232 of afterbody 240 to spar 202. The single bonded joint of adhesive provides added strength and consistent flexibility along the span of spar 202. Methods of adhering a thermoset material (i.e., spar 202) to a thermoplastic material (i.e., afterbody 240) are known in the art.

During operation, rotor blade 120 is subjected to a variety of loads. For example, rotor blade 120 may generate centrifugal forces in direction 242, in-plane loads such as lead/lag loads in direction 244, out-of-plane loads such as flapping loads in direction 246, and torsional loads such as a twisting of rotor blade 120 in direction 248 about pitch change axis 252. Conventionally, the aforementioned dynamic loading causes stress and strains that are primarily reacted by a spar. However, because afterbody 240 is unitarily formed, afterbody 240 may be capable of transferring loads in chord direction 226, beam direction 228, as well as torsional direction 248 resulting in a more damage tolerant afterbody than a conventional multi-piece afterbody.

Figure 5:
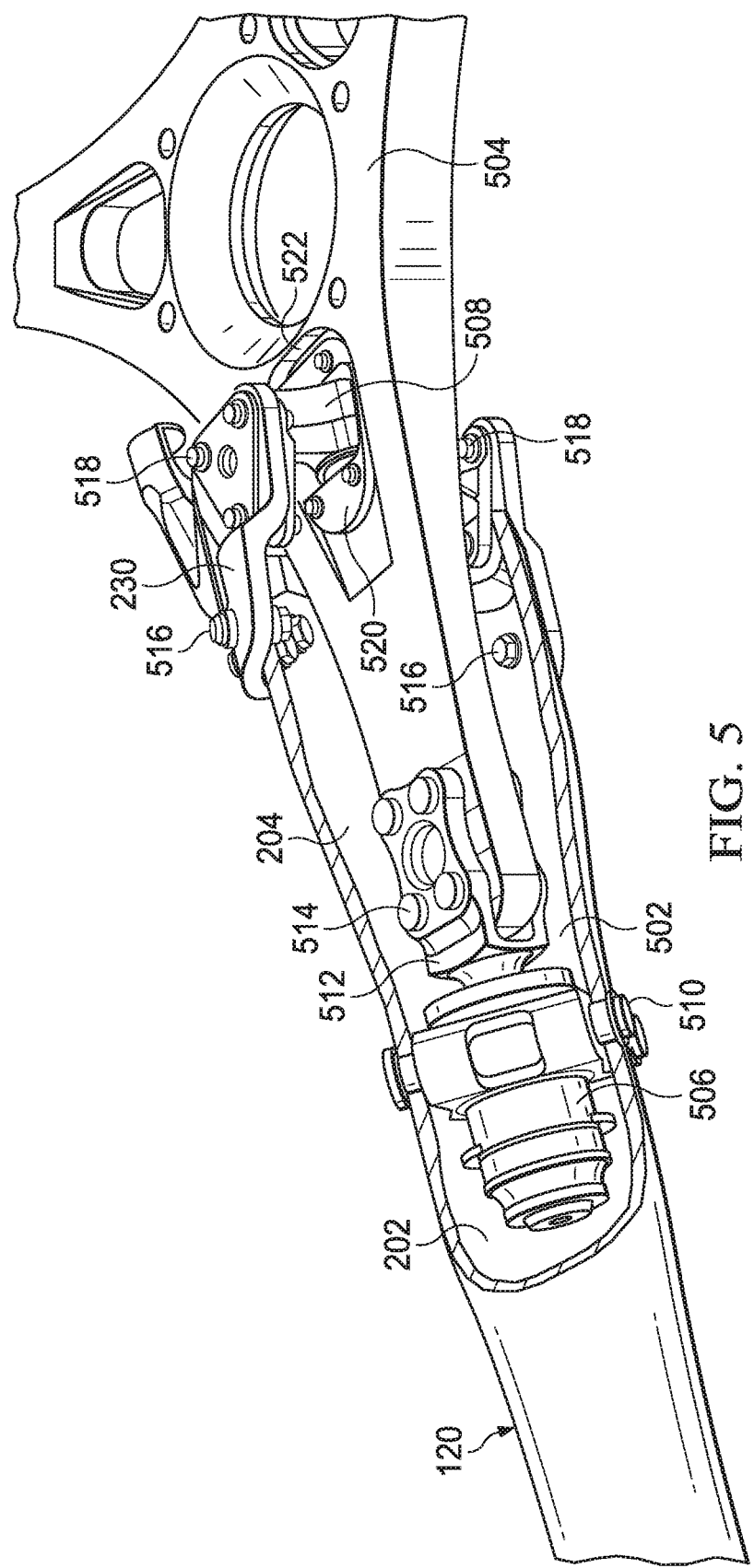
FIG. 5 is a partial cross-sectional view of a rotor blade coupled to a yoke according to one or more aspects of the disclosure.

Referring to FIG. 5, root section 204 of spar 202 forms an integral cuff 502 that enables spar 202 to be coupled with yoke 504 via bearing assembly 506 and bearing assembly 508. Integral cuff 502 is unitarily formed with root section 204. Spar 202 is coupled to bearing assembly 506 with pins 510 that extend through the upper and lower surfaces of spar 202. Bearing assembly 506 is coupled to yoke 504 with spindle 512 and bolts 514. In addition, spar 202 is coupled to bearing assembly 508 via pitch horn 230 with bolts 516 and bolts 518. Bearing assembly 508 is rotatably mounted within support structure 520 that is securely positioned within cut-out 522 in yoke 504. Via pitch horn 230, rotor blade 120 pivots relative to yoke 504 when the pitch of rotor blade 120 is adjusted during flight operations. In operation, yoke 504 is coupled to the engine and transmission via the drive shaft, thereby providing torque and rotational energy to rotor blade 120.

Figure 6:
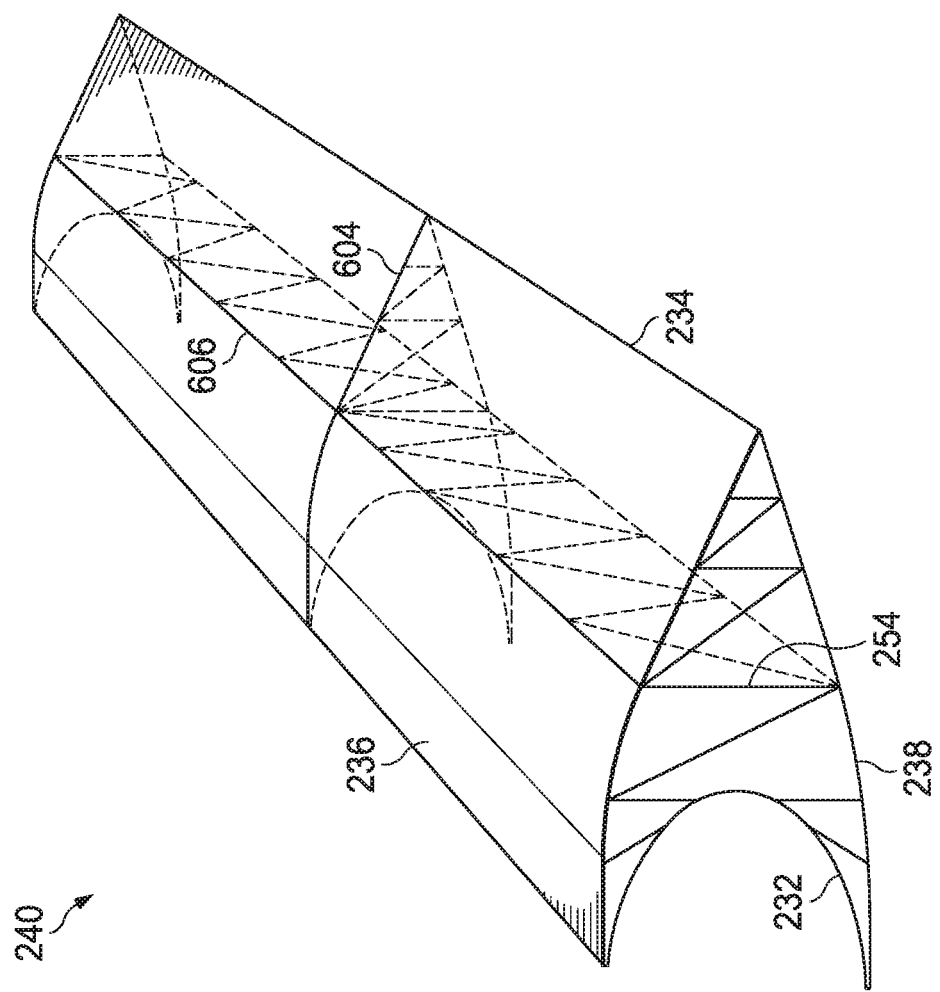
FIG. 6 is a perspective view of an afterbody of a rotor blade according to one or more aspects of the disclosure.
Figure 7:
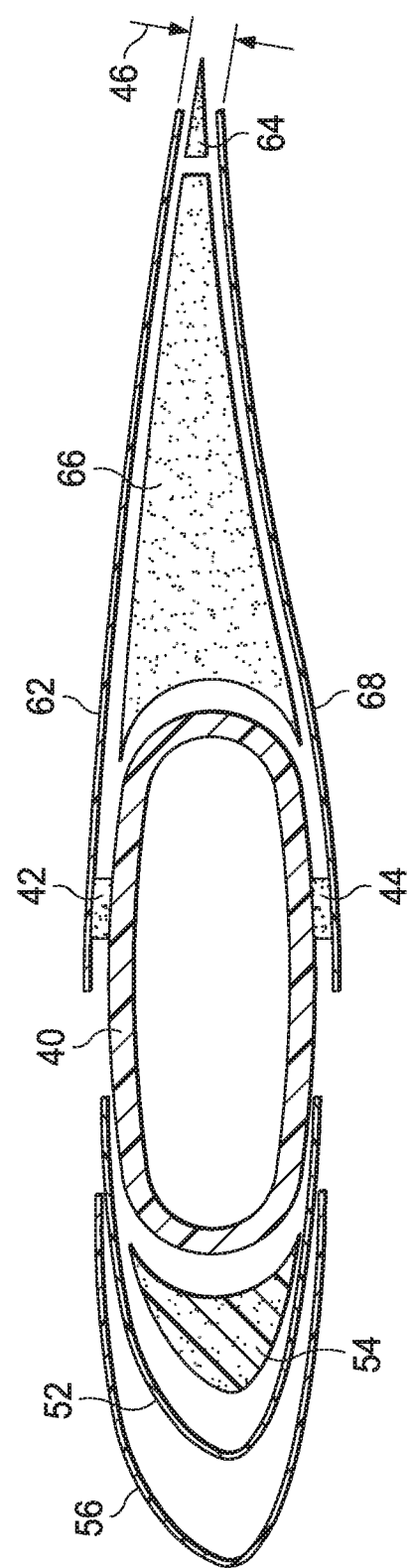
FIG. 7 is a cross-sectional view of a prior art rotor blade.

Referring to FIG. 6, afterbody 240 is a unitary or one-piece structure formed of a single thermoplastic material of construction including internal structure 254 encompassed by leading edge 232, upper surface 236, and lower surface 238. Internal structure 254 may include a collection of support shapes, for example, ribs 604 and stringers 606 to make up an internal support network encompassed by leading edge 232, upper surface 236, and lower surface 238. Internal structure 254 is not limited to ribs and stringers and may include a lattice arrangement of cells in the shape of, for example, square, triangle, oval, rectangle, etc. During manufacture, internal structure 254 is uniquely customized to have the local and global properties requisite to withstand the expected loading to be experienced by afterbody 240. The support shapes of internal structure 254 may be uniform in size and shape throughout the entirety of afterbody 240. Alternatively, the support shapes of internal structure 254 may not be uniform throughout the entirety of afterbody 240. The exact size, shape, and density of the support shapes of internal structure 254 are customized and application specific. Customized means that during manufacture of afterbody 240, the load characteristics required of a particular application of afterbody 240 are determined and the support shapes of internal structure 254 are designed to accommodate the identified loads. Internal structure 254 of each application of afterbody 240 may be unique depending on the requirements of the application.

Internal structure 254 may be manufactured in various arrangements of support shapes by processes such as solid freeform fabrication, additive manufacturing, or 3D printing. The common feature shared by these technologies is the ability to produce freeform, complex geometry components directly from a computer generated model. The processes generally rely on the concept of layerwise material addition in selected regions. A computer generated virtual model serves as the basis for creating internal structure 254. Because of the significant level of control, tailoring, and customizing of the micro and macroscopic components of internal structure 254, afterbody 240 is capable of addressing the dynamic requirements of a variety of rotor blade applications. An example of uniquely tailoring a rotor blade using additive manufacturing processes, owned by the present Applicant, is disclosed in U.S. patent application Ser. No. 15/658,928, filed Jul. 25, 2017. Injection molding, compression molding, and extrusion may be alternative ways to produce the thermoplastic afterbody 240.

Trailing edge 234 is considered a "zero" thickness trailing edge. The "zero" thickness trailing edge is formed at the intersection of upper surface 236 and lower surface 238. Afterbody 240 replaces the core, the upper and lower skins, and the trailing edge wedge of a conventional rotor blade. The joining of the upper skin to the lower skin at the trailing edge of a conventional rotor blade has inherent thickness comprised of at least the thickness of the material of the upper and lower skins and the bonding agent used to join them together. Since afterbody 240 does not include an upper skin bonded to a lower skin at the trailing edge, trailing edge 234 is not two surfaces bonded together and thus does not have the inherent thickness of two surfaces bonded together. Trailing edge 234 is the intersection of upper surface 236 with lower surface 238. Trailing edge 234, a "zero" thickness trailing edge, is thinner than the trailing edge of a conventional afterbody for improved aerodynamics of rotor blade 120. Trailing edge 234 is part of the unitarily formed afterbody 240 and is defined by the intersection of upper surface 236 with lower surface 238.

Afterbody 240 may be unitarily formed from root section 204 to tip section 208. Alternatively, afterbody 240 may include multiple unitarily formed segments that are connected to each other spanwise between root section 204 and tip section 208 where a chord-wise cross-section of each segment includes lower surface 238 disposed from upper surface 236, leading edge 232 between upper surface 236 and lower surface 238, trailing edge 234 at the intersection of upper surface 236 with lower surface 238, and internal structure 254 encompassed by leading edge 232, upper surface 236, and lower surface 238.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An afterbody for a rotor blade of a rotorcraft, comprising:
    a body unitarily formed of a single material of construction including an upper surface disposed from a lower surface, a leading edge extending from the upper surface to the lower surface, and a trailing edge formed at an intersection of the upper surface with the lower surface, wherein the upper and lower surfaces extend in a chord direction from the leading edge to the trailing edge and the leading edge is curved inward in the chord direction toward the trailing edge; and
    the body includes an internal structure encompassed by the leading edge, the upper surface, and the lower surface, the internal structure comprising at least one of a collection of ribs and stringers, or a lattice arrangement of cells.

2. The afterbody of claim 1, wherein the internal structure provides force resistance in both the chord direction and a beam direction.

3. The afterbody of claim 1, wherein the internal structure consists of the collection of ribs and stringers.

4. The afterbody of claim 1, wherein the internal structure consists of the lattice arrangement of cells.

5. The afterbody of claim 1, wherein the single material of construction is a thermoplastic material.

6. The afterbody of claim 1, wherein the trailing edge is without a first skin bonded to a second skin.

7. The rotor blade of claim 1, wherein the internal structure includes uniformly sized and shaped support structures.

8. The rotor blade of claim 1, wherein the internal structure includes non-uniformly sized and shaped support structures.

9. A rotor blade for a rotorcraft, comprising:
    a one-piece afterbody formed of a single material of construction without a separate upper skin and without a separate lower skin, the afterbody comprising an upper surface and a lower surface extending in a chord direction from a concave leading edge to a trailing edge formed at an intersection of the upper surface and the lower surface, wherein the concave leading edge is curved inward toward the trailing edge;
    a trailing side of a spar adhered to the one-piece afterbody at the concave leading edge; and
    an internal structure unitarily formed with the upper surface, the lower surface, the concave leading edge, and the trailing edge, wherein the structure includes non-uniformly sized and shaped support structures.

10. The rotor blade of claim 9, wherein an entirety of the concave leading edge is adhered to the trailing side of the spar with a single bonded joint.

11. The rotor blade of claim 9, wherein the internal structure is capable of transferring loads in both the chord direction and a beam direction.

12. The rotor blade of claim 9, wherein the spar is manufactured of thermoset material and the one-piece afterbody is manufactured of thermoplastic material.

13. The rotor blade of claim 9, wherein the internal structure comprises a collection of ribs and stringers.

14. The rotor blade of claim 9, wherein the internal structure comprises a lattice arrangement of cells.

15. A rotor blade for a rotorcraft, comprising:
    a spar including a root section, a tip section, a leading side, and a trailing side;
    an afterbody including a curved leading edge, an entirety of the curved leading edge adhered to the trailing side of the spar with a single bonded joint; and
    a chord-wise cross-sectional shape of the afterbody includes an upper surface extending in a chord direction from the curved leading edge to a trailing edge, a lower surface extending in the chord direction from the curved leading edge to the trailing edge, the trailing edge formed at an intersection of the upper surface with the lower surface and the curved leading edge curved inward in the chord direction toward the trailing edge, and an internal structure unitarily formed of a single material of construction with and encompassed by the upper surface, the lower surface, and the curved leading edge.

16. The rotor blade of claim 15, wherein the afterbody comprises a plurality of segments connected spanwise between the root section and the tip section where each segment of the plurality of segments includes the chord-wise cross-sectional shape.

17. The rotor blade of claim 15, wherein the internal structure comprises a collection of ribs and stringers.

18. The rotor blade of claim 15, wherein the internal structure comprises a lattice arrangement of cells.

* * * * *